United States Patent Office 3,270,177
Patented August 30, 1966

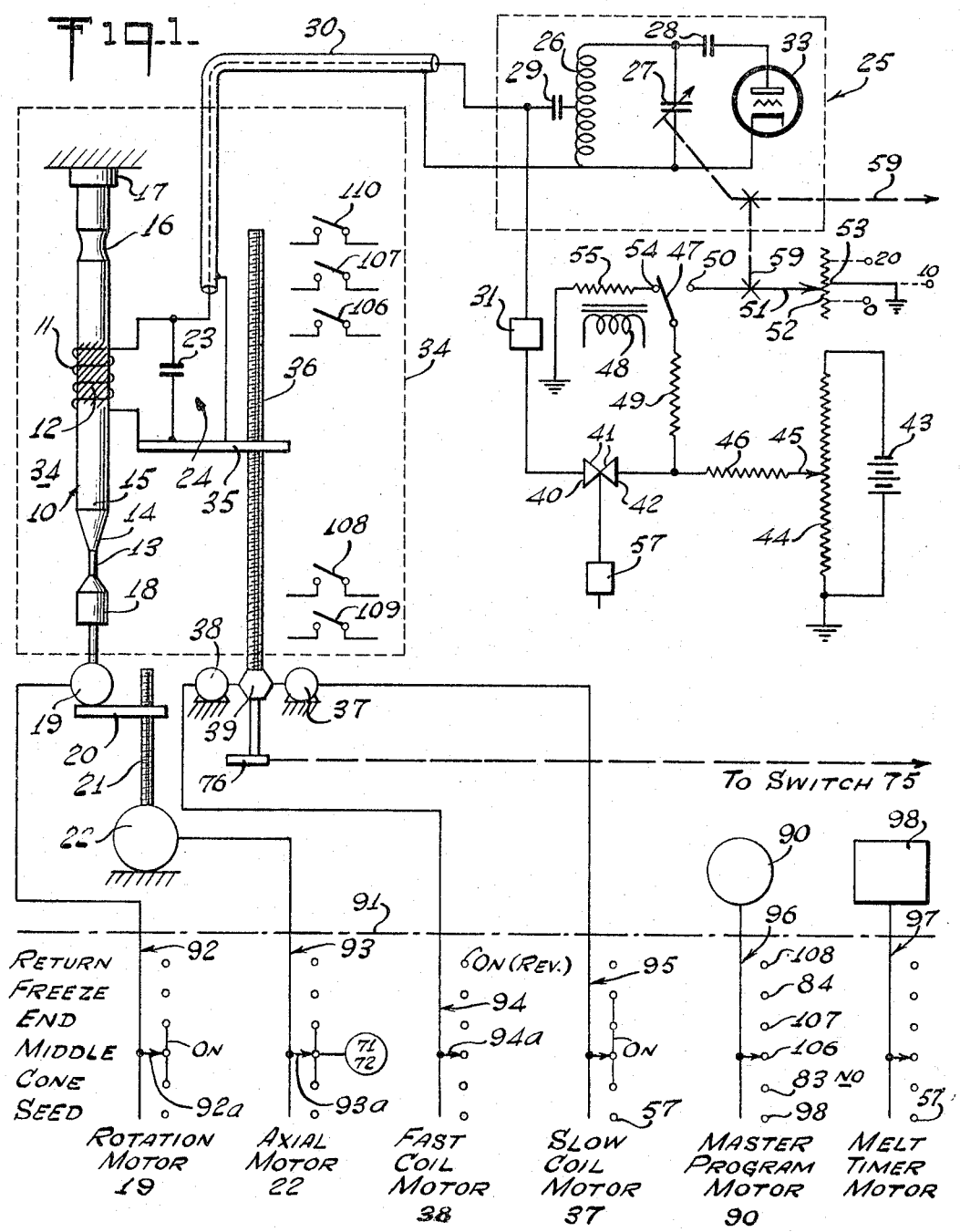

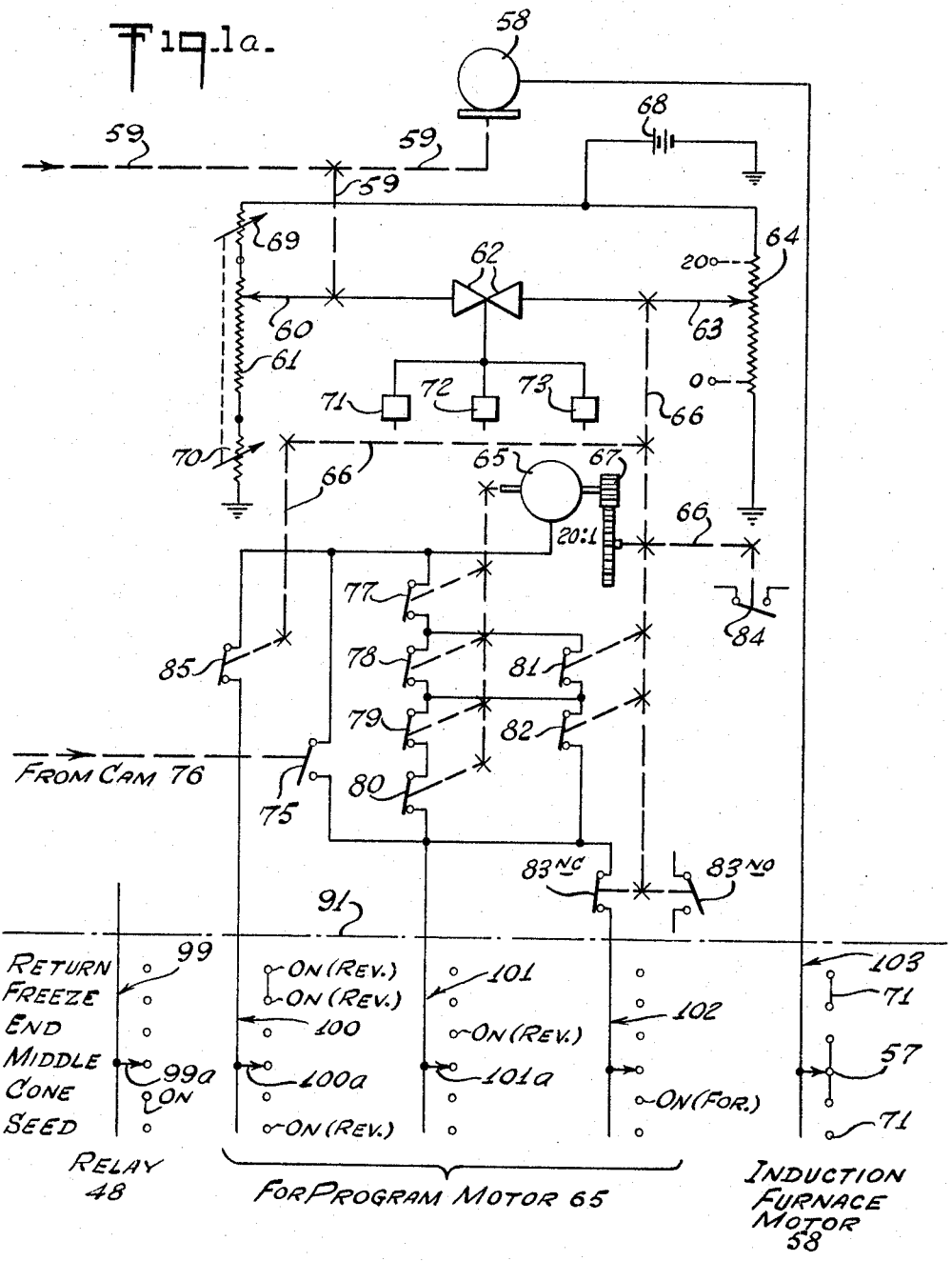

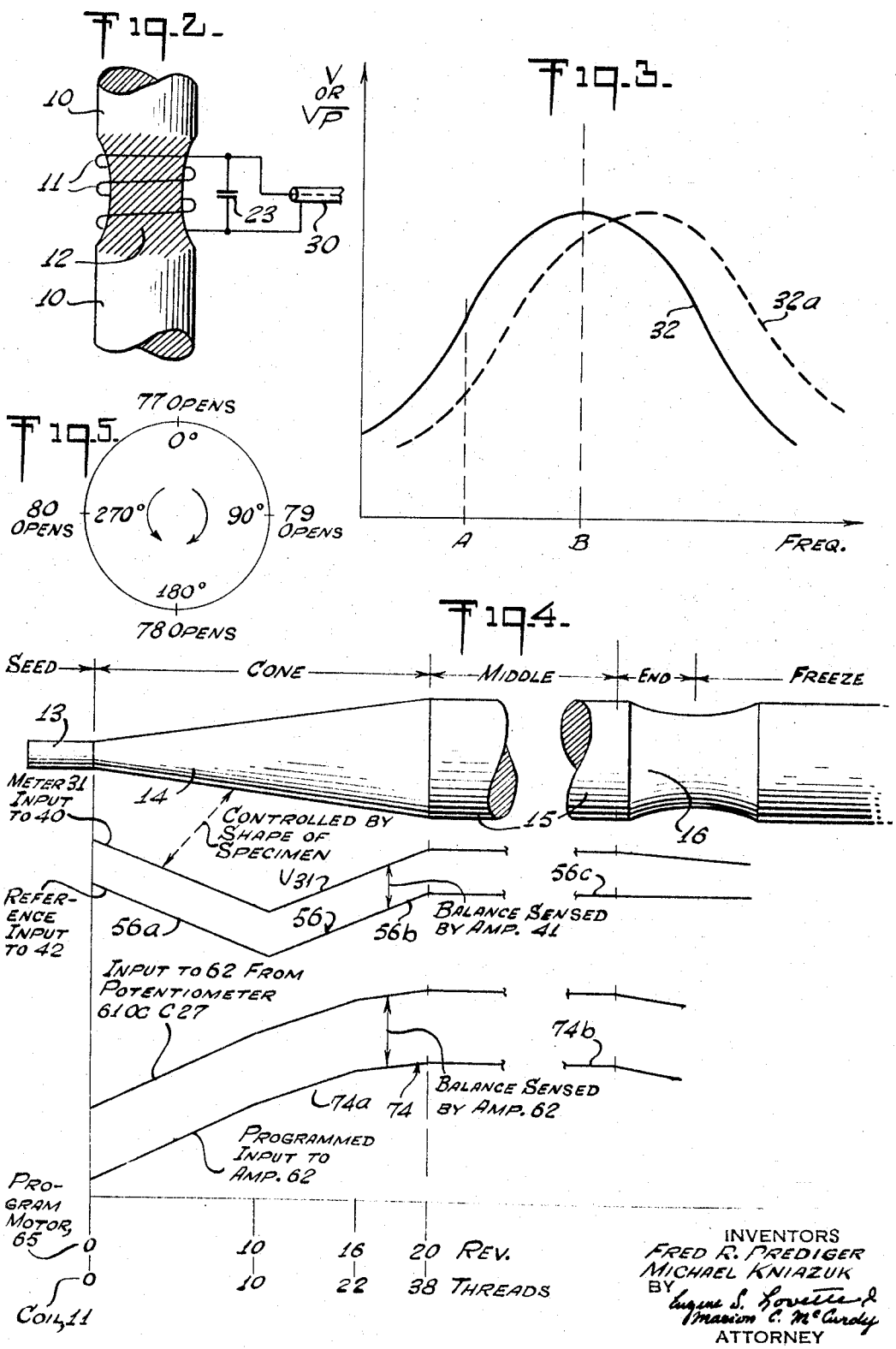

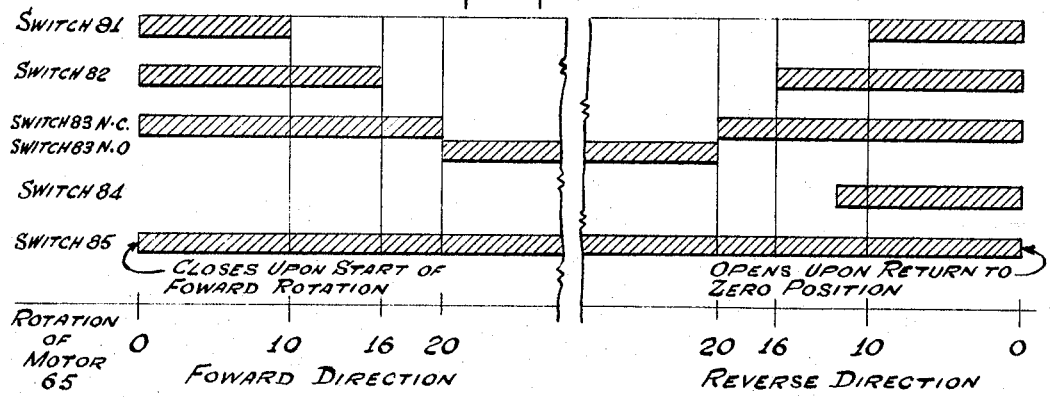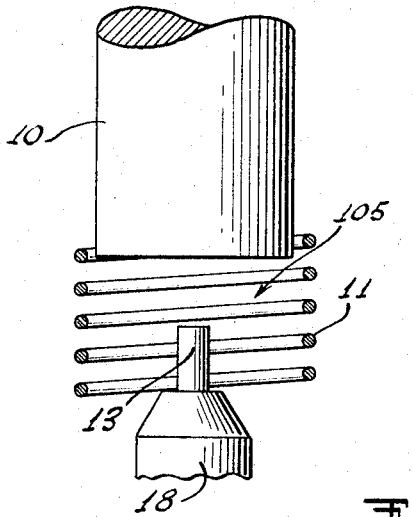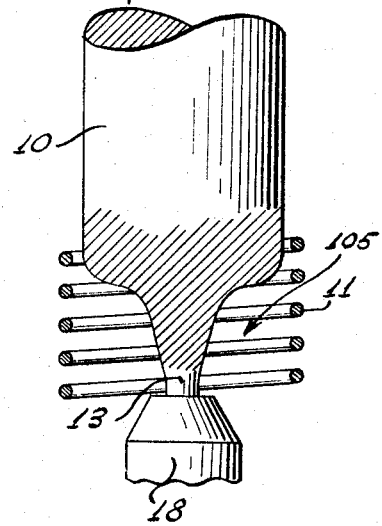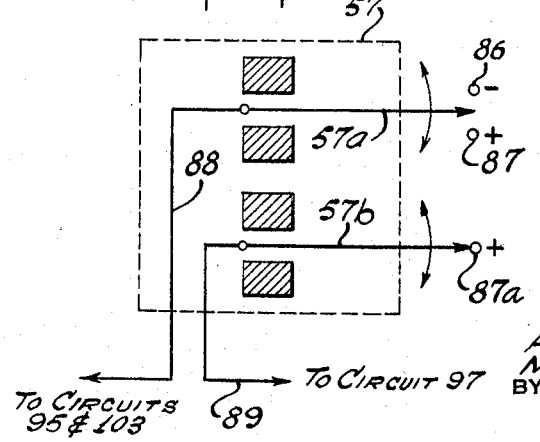

3,270,177
MEANS AND METHOD FOR AUTOMATIC ZONE REFINING A WORK PIECE
Fred R. Prediger, Westfield, and Michael Kniazuk, Mountainside, N.J., assignors to Merck & Co., Inc., Rahway, N.J., a corporation of New Jersey
Continuation of abandoned application Ser. No. 3,614, Jan. 20, 1960. This application Nov. 26, 1963, Ser. No. 327,869
26 Claims. (Cl. 219—10.77)

The present application is a continuation of application Serial No. 3,614, filed January 20, 1960, and now abandoned.

This invention relates to improved methods and means for purifying a specimen of conductive-like material and, in particular, relates to methods and apparatus for producing a rod-like monocrystal specimen of material, such as silicon by induction heating means.

It is a principal object of the present invention to provide improved methods and means for producing a refined monocrystal structure of conductive-like material, such as a silicon ingot, by means of an automatically controlled and regulated induction heating process.

It is a further object of the invention to heat the treated specimen by a movable inductance coiled around same, which coil is part of a resonant work tank circuit whereby successive overlapped portions of the specimen are heated to a molten state as the work coil advances in a selective direction along the specimen; the melting process also contemplates melting and fusing a monocrystal seed of like material to one end of the specimen and advancing the work coil from such end to the other end of the specimen whereby the specimen purifies as a monocrystal structure.

It is a further object of the invention to revolve the specimen during the melting operation concurrently with selectively stretching and compressing same for the purpose of automatically regulating and controlling the geometry of its molten zone; this assures proper size for the treated specimen and uniform melting of same.

It is a further object of the invention to combine the aforesaid rotational and axial stretching and compression actions in operative combination with automatic regulation of the RF power furnished to the work coil by improved feedback circuit means to assure proper melting of the specimen during the refining process.

In furtherance of the above objects, it is a further object of the invention to provide induction heating means incorporating a feedback circuit adapted to control automatically the geometry of the molten zone and the RF power furnished to the work tank circuit during the melting operation. The feedback circuit contemplates means for sensing the RF voltage across the work tank circuit and matching same against a reference voltage to produce a polarized signal for selectively regulating an oscillator tuning operator during the melting phase of operation. The operator in turn is adapted to adjust the oscillator frequency of the induction furnace. During the melting process, the reference source is regulated in accordance with a voltage pattern required for proper melting of successive sections of the ingot in accordance with its prescribed size. In addition, the feedback circuit also includes circuit means providing a voltage corresponding to the setting of the variable reactance element of the oscillator tank circuit which is matched against a reference programmed voltage synchronized with work coil movement along the specimen to produce a polarized signal for selectively regulating the geometry of the molten zone.

It is a further object of the invention to provide a program motor in the feedback circuit for synchronizing the programmed reference voltage with work coil movement, and switch means for regulating operation of the program motor through measured turns of revolution in selected directions as the work coil negotiates alternately its pass from the seed end of the ingot to its other end and then returns to its starting point. The feedback circuit also includes a multi-position program operator means which establishes operation for a plurality of circuits of the feedback system in synchronism with the position of the work coil along the ingot.

It is a further object of the invention to provide improved methods and means for controlling the RF power furnished to the induction heating work coil during zone refining operation of a conductive-like work piece in accordance with a prescribed size for the specimen section that is being melted simultaneously with regulating the size of the work piece.

It is a further object of the invention to provide improved methods and means for reliably and efficiently accomplishing refinement of conductive-like material by means of an induction heating process, wherein a parallel resonant work tank circuit is fed RF power from an oscillator adapted to operate at a frequency different than the resonant frequency of the work tank circuit and which work tank circuit is loosely coupled to the oscillator through coaxial feeder means. By reason of the foregoing arrangement, the feeder line essentially supplies the power dissipated in the work tank circuit and for other circuit or line losses whereby current in the feeder line is very much less than the heavy current in the work tank circuit loop. As a further advantage, feeder line may be a conventional coaxial line of appreciable length so that the oscillator may be conveniently located outside of the melting chamber enclosing the ingot specimen.

Further objects and advantages will become apparent from the following description of the invention taken in conjunction with the figures, in which:

FIGS. 1 and 1a illustrate the circuit schematic of an induction heating apparatus including its automatic zone refining feedback means for regulating and controlling refining of a semi-conductor specimen in accordance with the invention;

FIG. 2 is a fragmentary view illustrating the operative relationship of the work tank circuit and a portion of the ingot specimen during the melting process;

FIG. 3 illustrates a power and voltage characteristic curve as a function of frequency for the work tank circuit and is used in an explanation of the operation of the invention;

FIG. 4 illustrates voltage curves as a function of work coil position along the ingot specimen shown in FIG. 4 and is used in an explanation of the operation of the circuit;

FIGS. 5 and 6 depict schematically operation of certain of the switch means of the feedback circuit for operating the feedback program motor;

FIGS. 7 and 7a depict schematically the seed and the bottom end of the specimen prior to and just after fusing of same respectively; and FIG. 8 depicts schematically a circuit arrangement for one of the polarized relays in the automatic feedback control circuit of the zone refiner apparatus.

In FIGS. 1 and 2, a rod-like cylindrical specimen 10 of silicon is held vertically upright. In accordance with the instant invention, ingot 10 will be refined into a monocrystal structure of silicon. Refinement of the semi-conductor is effected by induction heating. A radio frequency current is fed to an inductance 11 coiled around ingot 10. The axial length of coil 11 is short compared to the axial length of ingot 10. Work coil 11 is supported to travel up and down along ingot 10. The RF current induces eddy current flow in the silicon, which causes extreme local heating of the portion of the silicon surrounded by work coil 11 with the result that this very hot zone transforms to a molten state. The molten zone extends throughout the cross-sectional thickness of ingot 10 and also co-extends the longitudinal length of work coil 11. The molten zone is depicted by the shaded area 12 in FIGS. 1 and 2, and is known as a floating zone because as work coil 11 moves slowly up along ingot 10, successive sections of the ingot overlapped by coil 11 become molten. Each locally heated section 12 purifies as it melts and then it solidifies as work coil 11 passes on to melt the next successive ingot section.

In order to refine the cylinder of silicon into a monocrystal structure, a refined monocrystal silicon seed 13 is fused to the bottom of ingot 10 by induction heating. Melting of the silicon in accordance with the practice of the instant invention starts with seed 13. As successive sections 12 cure upon upward advance of coil 11, the monocrystal structure extends from the seed into and along ingot 10. In actual practice, when the diameter of seed 13 is much smaller than the diameter of ingot 10, the bottom portion 14 of ingot 10 is formed with a cone-shaped taper during zone melting to provide a continuous joint with seed 13. As the diameter of the semi-conductor increases, more power is required to melt same. Accordingly, the improved floating zone refining apparatus of the instant invention is adapted to regulate automatically and continuously the RF energy supplied to work coil 11 as it forms tapered part 14 and also during melting of the longer uniform diameter middle portion 15 of ingot. The zone refiner apparatus contemplates an automatic feedback control system, whereby work coil 11 is continuously supplied with a programmed amount of RF power in accordance with the size or shape of that portion of the silicon then undergoing induction heating and melting. The upper end of ingot 10 is also formed with a tapered portion 16. This part of ingot 10 represents the upper limit of the useful portion of the silicon rod. The automatic zone refiner apparatus is also adapted to regulate the power supplied to work coil 11 for melting specimen portion 16 as well as the other portions of silicon ingot 10.

A cylindrical ingot of uniform diameter is supported vertically from its upper end by holding means such as a stationary chuck 17 in preparation for refining the specimen. The lower end of ingot 10 is spaced a small distance above seed 13 as depicted in FIG. 7, which end is cut preferably normal to its longitudinal axis to simplify forming tapered portion 14 and fusing the lower end to seed 13. Seed 13 is held vertically upright in alignment with ingot 10 by holding means such as chuck 18. The juxtaposed ends of ingot 10 and seed 13 are fused during the melting operation in a manner to be discussed hereinafter. Chuck 18 is supported for rotation about the vertical ingot axis by a motor 19. Motor 19 is supported on a horizontal platform structure 20. Platform 20 may be raised or lowered by a worm-drive mechanism 21. Worm drive 21 is operated by a reversible motor 22, and motor 22 is supported on a stationary structural reference. Rotation of motor 22 in one or the other of its opposite directions will raise or lower platform 20, respectively, to compress or stretch ingot 10 along its longitudinal axis.

During the melting phases of the zone refinement operation, motor 19 rotates continuously in one direction to impart like rotation to seed 13 and the ingot fused thereto. This turning motion extends up to and throughout the molten zone wherever it may be at the particular stage of the operation. The portion of ingot 10 above its molten zone and up to its gripped top end remains stationary with respect to the revolving lower portion of the ingot. The turning action is taken up in the molten zone 12. Axial compression and stretching also occurs in the molten zone section of the ingot. Rotation of ingot 10 aids in integrating the heat throughout the interior of molten zone 12 and also serves to indicate that zone 12 is molten throughout its interior.

Molten zone 12 develops and maintains an hour glass shape as depicted in FIG. 2 during the melting operation. This is attributed to the repulsion action of the magnetic field from work coil 11 upon the circulating currents in ingot 10 and due to sag of the molten material caused by gravity. For proper zone refinement in accordance with the practice of the instant invention, the shape and size or diameter of the ingot is controlled by stretching or compressing its molten zone 12. This action assures proper diametrical size of the ingot when the molten zone freezes out. The term "freezes out" is used herein to mean a degree of cooling whereby molten zone 12 returns to a relatively solid state during each successive pass of work coil 11 along ingot specimen 10.

A certain amount of control and regulation of the melting process can be accomplished merely by regulating the RF power supplied to work coil 11. However, such an arrangement does not provide sufficient regulation or satisfactory control for the zone purification operation, because it does not assure control of the diametrical size of the ingot and correlated regulation of the power to melt same. Complete regulation and control of the ingot geometry and power to melt same is accomplished when the molten zone is axially stretched or axially compressed during the purification process in operative association with regulation of the RF power supplied to work coil 11. The combination of rotation motor 19 and worm drive 21 to provide controlled axial compression and stretching of molten zone 12 in operative association with correlated regulation of RF power to work coil 11, will hold diametrical variations of ingot specimens to less than .1 mm. for a specimen diameter of 2.0 cm. By reason of the foregoing techniques, the diameter of the refined monocrystal silicon specimen may be varied and controlled at will to accommodate a prescribed size and shape.

In order to exercise the foregoing regulation and control, it is necessary to detect automatically and continuously the diameter of molten zone 12 and variations thereof from a prescribed size during the melting operation. Work coil 11 also provides a very convenient instrument for such detection. A change of ingot shape, i.e. its diameter, will change the effective inductance and resistance of work coil 11. Work coil 11 is resonated by a parallel connected capacitor 23 to define a work tank circuit 24 operated preferably at a frequency slightly above the frequency of the RF generator. An RF generator 25 is adapted to supply RF energy to work tank circuit 24 and includes an induction furnace depicted as triode 33 and a resonant tank circuit made up of oscillator coil 26 in parallel with a tuning capacitor 27. The oscillator tank circuit is connected through a capacitor 28 across the plate and cathode of the furnace tube 33.

The resonant frequency characteristics of work tank circuit 24 will vary during the zone melting operation. It is desirous that such frequency characteristic changes occurring in work tank circuit 24 have little, if any, direct pulling reaction on the oscillating frequency of generator 25. Consequently, RF generator 25 is loosely coupled to its load through a small coupling capacitor 29 connected to oscillator coil 26 as depicted in FIG. 1. The capacitance of capacitor 29 is very much less than the equivalent capacitance of the work tank circuit. A coaxial feeder line 30 couples generator 25 to its load 24. At its output end, coaxial line 30 is connected across work tank circuit 24. At its input end, the center conductor of line 30 is conductively in series with capacitor 29 and the outer conductor thereof is connected to the grounded side of the circuit.

An RF voltage sensing device, such as RF rectifier meter 31, is coupled into coaxial line 30 to measure the voltage across work coil 11. Meter 31 provides a D.C. voltage proportional to the RF voltage across work coil 11.

This D.C. voltage is compared to a reference D.C. voltage of prescribed or controlled value for the purpose of automatic feedback control operation. Geometric changes of molten zone 12, even very small changes of its diameter, will cause the resonant frequency of work tank circuit 24 to change. The resonant frequency change will be sensed by meter 31, which meter will indicate such changes by a corresponding change in its D.C. output voltage. Power delivered to ingot specimen 10 will be affected by a change of work tank circuit resonance, and this is illustrated by a curve 32 of FIG. 3, which curve depicts voltage and power characteristics of work tank circuit 24 as a function of frequency. Point A indicates the oscillator frequency of generator 25 and point B indicates work tank circuit resonance. For example, in a situation where the size of the ingot specimen increases, curve 32 shifts to the right, depicted by curve 32a, which indicates a smaller amount of power taken by work tank circuit 24 as a result of the increasing diameter. It will be understood that changes of resonant frequency of work tank circuit 24 will have little if any pulling action on the operating frequency of generator 25 because the latter is loosely coupled to its load. Voltage sensed by meter 31, hence the voltage across the work tank circuit 24 and the RF power supplied thereto, can be returned to its original or proper value or to some other prescribed value by stretching or compressing molten zone 12 during the melting operation.

Two methods of operation can be realized by a system as previously described. One method involves operating RF generator 25 at the same frequency as the resonant frequency of work tank circuit 24. In this situation, if the diameter of molten zone 12 increases or decreases during melting operation, power to work tank circuit 24 will decrease for changes in either direction and so will the voltage across work coil 11. Consequently, meter 31 will not be able to distinguish whether the gauged molten zone diameter has increased or decreased. One way to distinguish an increase or decrease of molten zone diameter is to detect phase angle difference between the RF voltage across work coil 11 and the generator voltage. However, this method is not entirely satisfactory.

The method contemplated herein involves operating the generator frequency along one side of the resonant frequency curve 32 of work tank circuit 24, for example in the illustrated embodiment the oscillator frequency is slightly below the resonant frequency of tank circuit 24. Hence, power to work coil 11 automatically decreases as more molten material accumulates inside the surrounding coil 11. On the other hand, power to work coil 11 increases for less molten material in the center region of work coil 11. Correspondingly, voltage across work coil 11 decreases or increases as the molten zone diameter increases or decreases, respectively. Therefore, detecting device 31 may take the form of a simple voltage detector and rectifier means adapted to supply a D.C. voltage indicating whether the gauged molten zone diameter is changing, and if so, if it is increasing or decreasing. When the size of the gauged molten zone 12 increases, the circulating current in ingot specimen 10 also increases which reduces the net magnetic flux linking work coil 11 in accordance with Lens' law. This results in a reduction of coil inductance, "L"; and $$L = N\frac{\phi}{I}$$

where "N" is the number of coil turns, "$\phi$" is the net flux linking work coil 11 and "I" is coil current. With a reduction of coil inductance, the resonant frequency "w" of the work tank circuit increases;

$$w = \frac{1}{\sqrt{LC}}$$

where "C" is the capacitance of tank circuit capacitor 23. As noted hereinbefore, generator 25 is operated below work tank circuit resonant frequency. Consequently, an increase of work tank circuit resonant frequency means a greater separation from the generator frequency and thus less RF power delivered to work coil 11 with a corresponding voltage drop across same. This is depicted by the shift of curve 32 to the right. The exact opposite results when the size of molten zone 12 decreases, which results in more power delivered to work coil 11 with an increase of voltage drop across same.

The foregoing circuit operation also provides an additional advantage. By resonating work coil 11 with capacitor 23, the extremely heavy coil currents necessary to induce the heating currents in ingot specimen 10 are confined to the work tank circuit 24. Hence, coaxial feeder line 30 need only carry the active power, no reactive power, dissipated in work tank circuit 24 and to cover other circuit losses. This means that the current flow in feeder line 30 is very low compared to work coil current. Consequently, feed line 30 may be a flexible coaxial line. In addition, line 30 may be sufficiently long to locate the generator 25 at some conveniently spaced distance from the zone purification chamber 34. The load end of feeder line 30 is fed through proper seals into a gas type purification chamber depicted by outline 34 wherein the entire zone refining apparatus is enclosed so that zone melting can be carried out under desired heat and gas atmospheres. Work coil 11 is made of water cooled copper tubing and capacitor 24 is made of a plurality of copper plates also incorporating suitable water cooling means.

Electronic grade silicon has a negative resistance-temperature coefficient, and it is a relatively poor conductor at room temperature. Hence, prior to the initial stage of the melting operation, the silicon specimen is preheated to about 500° C. so that it will support large circulating currents. Silicon specimen 10 may be preheated by radiation and/or conduction, such as heating the holding devices, metal chucks 17, 18 and/or including heater elements (not shown) in chamber 34 or by applying a very high voltage between chucks 17, 18. When the silicon specimen becomes sufficiently warm, its resistance drops so that it will readily support large internal circulating currents. Once this stage is reached, specimen 10 will support a heated red area slightly below the silicon melting point. The hot red zone may be efficiently and readily converted to a molten zone by increasing the power to coil 11 to a suitable value.

Work tank circuit 24 is supported on a horizontal platform structure 35 which platform is conductive if it is used as the ground side of work tank circuit 24. Platform 35 is raised or lowered by a substantially long worm-drive mechanism 36. Worm drive 36 is alternately operated by one of a pair of D.C. motors 37 and 38. Motor 37 is a reversible slow speed motor and is normally used to raise platform 35 so as to advance work coil 11 slowly up along the ingot during melting operation. Motor 38 is a fast speed motor and is used to lower platform 35 and return coil 11 to the lower end of ingot 10 at a much faster rate. Both motors 37 and 38 are coupled to worm drive 36 by a differential gear mechanism 39.

Sensing meter 31 measures the voltage across the input ends of feeder line 30. This voltage is essentially equal to the voltage across work coil 11 because of small line losses. The D.C. output from sensing meter 31 is supplied to one input terminal 40 of a differential voltage amplifier 41. This D.C. output is compared or balanced against a prescribed and programmed D.C. reference voltage fed to the other input terminal 42 of amplifier 41. The reference voltage is formed by an adjustable voltage divider network including a D.C. source 43 connected across a potentiometer 44 and grounded at one side. Amplifier input 42 is connected to a potentiometer slider arm 45 through a fixed resistance 46 and ground. The reference source to terminal 42 is regulated automatically to provide a voltage pattern which corresponds to RF power required for proper melting of the ingot during the various phases of zone refining operation. The automatic regulation is accomplished by connecting amplifier terminal 42 to a movable two-position relay arm 47 of a relay 48 through a fixed resistance 49. One relay terminal 50 is connected to a slider arm 51 of a potentiometer 52. The potentiometer element is grounded at a tap 53. The other relay terminal 54 is in series with ground through a fixed resistance 55. The D.C. reference input to amplifier 41 is constant when relay arm 47 is in its left-hand position. A variable reference voltage is used for regulating the induction furnace when shaping taper portion 14. During the latter phase of operation, relay arm 47 is in its right-hand position whereby the reference voltage depends upon the position of slider arm 51 along its resistance element 52. When slider arm 51 is at its lower terminal end and advances to grounded tap 53, the reference voltage will gradually decrease to a minimum value as depicted by the portion 56a of curve 56 in FIG. 4. When slider 51 reaches tap 53 and then advances to its upper terminus, reference voltage 56 gradually increases from its minimum and this is depicted by portion 56b of the curve. The flat curve portion 56c depicts the constant reference voltage fed to amplifier terminal 42 when arm 47 is connected to ground through resistor 55. The level of the reference voltage may be adjusted by slider arm 45.

The reason for the V-shaped voltage pattern is as follows. It will be understood that the RF power required to melt any given axial section of the ingot specimen is directly proportional to its volume. More power is required to melt a given section of the ingot specimen of larger diameter than required for a smaller diameter section. On the other hand, work coil 11 is a fixed diameter structure whereby the concentric separation between coil 11 and the ingot core is small at the upper end of taper portion 14 and relatively very large at the seed end thereof. The magnetic coupling between coil 11 and the ingot core is relatively small at the ingot seed end and increases correspondingly with coil movement upwardly along taper portion 14. Consequently, in regulating the power supplied by the induction furnace to assure proper melting along the entire taper portion 14, the variable magnetic coupling factor along such portion is taken into consideration. It has been found that the illustrated V-shaped reference voltage provides desired power regulation to assure such uniform melt operation. During melt operation, generator 25 is continuously regulated by adjustments of its capacitor setting in synchronization with coil movement to provide power in accordance with the prescribed voltage pattern thereby assuring proper melting of the ingot. When the power dissipated by the melt operation follows the programmed pattern, the feedback circuit is in balanced condition, otherwise, the feedback circuit takes proper corrective measures to compensate for unbalances that arise.

In accordance with the invention, the measured voltage provided by meter 31, and depicted as curve $V_{31}$ in FIG. 4, is matched against the aforesaid reference voltage. When the melting operation is proceeding in agreement with the programmed pattern prescribed for the ingot specimen, meter voltage $V_{31}$ follows the pattern of the reference voltage curve 56, whereby the difference between the two voltages is some predetermined value representing a balanced status. On the other hand, when meter 31 senses a variation in the shape, thickness or geometry of molten zone 12, and if this results in a disruption of balance or disturbs the predetermined difference between the meter voltage $V_{31}$ and reference voltage, curve 56, the output of amplifier 41 actuates a polarized relay 57. Relay 57 is adapted to actuate a reversible operator motor 58, which motor will turn in one or the other of its opposite directions in accordance with the polarity of the relay signal. Polarity of the relay signal will depend upon the sense of unbalance. The output of motor 58 is mechanically linked, depicted by reference 59, to turn tuning capacitor 27 which will be reset in a direction to correct or wipe out the unbalance between the input voltages to amplifier 41. Motor 58 is also adapted to operate slider arm 51 and a slider arm 60 of a potentiometer 61. Setting of capacitor 27 and slider arm 51 by the foregoing feedback adjustment also changes the D.C. reference to amplifier 41 and temporarily returns the melting operation to balance status. Setting of arm 60 institutes operation of the remainder of the feedback circuit for imparting axial stretching or compression to the molten zone to institute dimensional corrections to compensate for the gauged dimensional variation in the molten zone which initially actuated the foregoing feedback corrective operation.

Potentiometer arm 60 supplies a D.C. voltage to one input terminal of a second differential amplifier 62. The setting of arm 60 is regulated by operator motor 58 whereby the voltage potential at arm 60 and fed to amplifier 62 corresponds to and indicates the actual setting for capacitor 27. The other D.C. input voltage supplied to amplifier 62 is taken from a slider 63 of a potentiometer 64. Movement of slider 63 from one terminal end position to its other terminal end position along potentiometer element 64 is synchronized with movement of coil 11 along ingot 10. A reversible program motor 65 drives slider 63 by a mechanical link depicted by 66. Mechanical link 66 includes a 20:1 gear system 67. Since slider 63 moves one-twentieth the speed of motor 65, twenty revolutions of motor 65 causes a single pass of slider 63 between its two terminal end positions. The movement of slider 63 along potentiometer element 64 is regulated so that its potential corresponds to the prescribed and programmed thickness for ingot specimen 10, including its tapered portion 14. Hence, the position of slider 63 also indicates the desired settings of capacitor 27 for proper zone refining operation. The variable programmed voltage is depicted by the sloping portion 74a of curve 74 as a function of work coil position in FIG. 4. In accordance with the instant invention, the voltage input from potentiometer arm 60 (which voltage indicates the actual setting of capacitor 27) is matched and made to follow the program voltage furnished by potentiometer arm 63 which indicates the desired setting for capacitor 27.

A constant voltage source 68 is used to supply current to the circuits of potentiometers 61 and 64, which circuits are completed through ground. The circuit of potentiometer 61 includes a pair of ganged and adjustable resistances 69 and 70. Resistor 69 is adjustable to provide a proper upper voltage limit to potentiometer 61. Resistor 70 holds the zero position of potentiometer 61 fixed as its resistance is varied. Differential amplifier 62 is adapted to compare the D.C. input voltages supplied thereto whereby deviation from balance and the sense of said unbalance is amplified to actuate one or more of three polarized relays 71, 72 and 73. Relay 71 is extremely sensitive and is adapted to respond to voltage unbalances of operating magnitudes normally experienced during zone refining operation. Relay 72 is less sensitive than the first relay and is adapted for operation in response to voltage unbalances of much greater magnitude than normally actuating the first relay. The third relay 73 is a very coarse polarized relay and is adapted to operate a suitable alarm (not shown) or other danger signal device in response to severe or heavy magnitude of voltage unbalance sensed by amplifier 62.

Operation of motor 65 is programmed and synchronized with movement of work coil 11 along ingot specimen 10. Motor 65 is actuated to revolve in one direction, for example a forward direction, for a total of twenty revolutions during upward travel of work coil 11 as the coil forms ingot tapered portion 14. This action corresponds to one complete sweep of potentiometer slider 63 from its lower terminal position to its upper terminal position. During forward turning, program motor 65 is not operated to run continuously, but is actuated by triggering means to turn in ten successive steps each of one revolution per step and then twelve successive steps each of one-half revolution and then sixteen successive steps each of one-quarter revolution. The foregoing amounts to a total of twenty revolutions of turning in a forward direction as work coil 11 is forming tapered portion 14 of specimen 10.

Program motor 65 does not turn during the next phase of operation while work coil 11 continues its movement along the uniform diameter portion 15 of specimen 10. Program motor 65 is actuated again when coil 11 moves along the upper part of specimen 10 to form tapered portion 16. During this latter phase of operation, program motor 65 revolves in its reverse direction to return slider 63 from its upper terminus to its lower terminus. As upper taper 16 is being formed, program motor 65 is triggered to run through the aforesaid sequence of steps in a backwards relationship, except that as seen hereinafter, operation of program motor 65 through the foregoing sequence of steps in reversed direction is interrupted approximately at the completion of the sixteenth one-quarter step. Thereafter, motor 65 is energized to turn continuously to complete its twenty revolutions in reverse direction to return to zero position.

Each motor step is triggered by cam actuator switch means 75, 76. Switch 75 is normally open. Cam 76 is operatively associated with worm drive 36 and turns therewith pursuant to a one-to-one ratio. The operation is such that switch 75 closes for a short duration and then re-opens once for each revolution of worm drive 36. One complete revolution of worm drive 36 advances work coil 11 one thread upwardly. As worm drive 36 turns, cam actuator switch 75 will trigger program motor 65 to make a single full revolution or a single one-half revolution or a single one-quarter revolution according to its stage of the operation, whereby potentiometer slider 63 is driven one-twentieth or one-fortieth or one-eightieth of its total travel. By the foregoing arrangement, 38 motor steps or 38 revolutions of coil drive 36 will rotate motor 65 through twenty revolutions as shown by the horizontal co-ordinate in FIG. 4. This means that work coil 11 will advance 38 threads in synchronism with one complete upward pass of potentiometer slider 63 from one terminus to its other terminus. It will also be noted from the foregoing discussion and FIG. 4, that the first ten thread advancements of coil 11 corresponds to movement of slider 63 half way up along potentiometer element 64 from its lower terminus as program motor 65 undergoes 50% of its forward program turning. The next twelve thread advancements of coil 11 corresponds to movement of slider 63 to its 80% position from its starting terminus with program motor fulfilling 80% of its program turning in forward direction.

Contacts 77 through 80 are cam operated micro switches actuated by program motor rotation at a one-to-one ratio. These switches are actuated by cam means (not shown) operatively associated with the shaft of motor 65. Contacts 77 through 80 are normally closed at all times during melting operation except for the following situations. Contact 77 opens up and remains open only when the shaft of program motor 65 is at its zero degree position. Contact 78 opens up and remains open when the shaft of program motor 65 is at its 180 degrees position. Contacts 79 and 80 open up and remain open when the shaft of program motor 65 is at its 90 and 270 degrees position, respectively. Cam actuator contacts 77–80 return to normally closed status when program motor shaft passes the correlated mentioned angular positions of rotation. The foregoing described arrangement is depicted schematically in FIG. 5.

Contacts 81 through 85 are a second group of cam operated micro switches actuated by cam means (not shown) operatively associated with rotation of program motor shaft. The cam operator is responsive to program motor shaft rotation through gear train 67, whereby twenty revolutions of program motor 65 completes one cycle of operation for these six contacts. Six contacts are involved because switch 83 includes a pair of contacts, i.e. 83nc, normally closed, and contact 83no, normally opened. The operation of switches 81–85 are depicted schematically in FIG. 6 and are as follows. Switch contact 81 is closed by its cam operator when program motor shaft is at zero or start position in preparation to turn in its forward direction. Contact 81 remains closed for the first ten revolutions of program motor turning in forward direction, and is opened at the start of the eleventh revolution of program motor turning. Switch 81 stays open for twenty more revolutions of program motor turning, that is, the last ten revolutions of turning in its forward direction and the first ten revolutions of turning in reverse direction. For convenience, switch contact 81 is closed for the last ten revolutions of program motor turning in reverse direction even though at this time the closed switch is no longer in an active circuit. This latter action occurs during "freeze" or "return" phase operation. As will be seen hereinafter, during such operation, program motor is no longer stepping but is rotating continuously in reverse direction to return to zero or start position. Switch contact 82 operates in the same manner except that it opens up for the last four revolutions of forward rotation of motor 65 and continues to remain open for the first four revolutions during reverse rotation of motor 65. Switch contact 82 is closed for the last sixteen revolutions of program motor turning in its reverse direction.

The normally closed switch contact 83nc opens up and the normally open switch contact 83no closes at the completion of twenty revolutions of forward rotation of program motor 65. Switch contacts 83nc and 83no return to normally closed and open status when reverse motor rotation starts. Switch contact 84 is normally open; its cam operator is actuated by the program motor shaft to close switch 84 a measured time interval after the start of "freeze" phase operation at which time work coil 11 is above tapered portion 16 at the upper end of ingot 10 so as to actuate return of work coil 11 to its position at the lower end of ingot 10. This will be explained in greater detail hereinafter. Switch 84 remains closed a suitable interval of time to effect "return" phase of operation by the illustrated stepper control circuit, and then switch 84 returns to open status. Switch contact 85 is normally closed during the entire zone refining operation except that it opens up when program motor 65 completes its reverse rotation. Switch contact 85 returns to closed status when motor 65 starts to rotate in its forward direction.

A master program unit includes a master program motor 90 for actuating a six step-eleven circuit rotary switch 91. Switch 91 is adapted to rotate in one direction one step at a time each time master program motor 90 is actuated. The eleven circuits of switch 91 are schematically illustrated at the bottom of FIG. 1. For example, the six steps or level positions for each of the eleven switch circuits are identified as (1) "seed," (2) "cone," (3) "middle," (4) "end," (5) "freeze" and (6) "return."

The first switch circuit 92 supplies the electrical line source to operate rotation motor 19 during the second, third and fourth steps of switch operation. Motor 19 is operated to turn at a constant speed in the order of 30 to 60 r.p.m. When the switch slider 92a is in "cone," "middle" and "end" positions, it conductively connects to live terminals to cause turning of motor 19. The other terminals are dummies whereby motor 19 is not energized and thus remains stationary. Hence, ingot specimen 10 is not revolved about its longitudinal axis while work coil 11 is undergoing "seed," freeze" and "return" phases of operation.

The second switch circuit 93 regulates turning of reversible motor 22 for raising and lowering platform 20. Motor 22 is energized during the second, third and fourth switch steps and only in response to signals received from relay 71 or 72. Motor will turn in one or the other of its opposite directions depending upon the polarity of the actuating relay signal either to compress or stretch molten zone 12, respectively.

The next switch circuit 94 provides the energizing source for fast speed, coil return motor 38. Motor 38 is inactive during the first five switch steps. Motor 38 is connected to an active line only for "return" operation, wherein motor 38 operates worm drive 36 in a direction to return platform 35 and thus work coil 11 to the bottom of ingot specimen 10.

Circuit 95 provides the energizing source for slow speed coil return motor 37. During the second through fifth phases of operation, motor 37 is connected directly to a line source for its turning power whereby it turns in the direction to cause upward travel of work coil 11 along ingot 10. Motor 37 is also energized by the polarized signal from relay 57 during "seed" phase of operation. At the time this relay signal is imposed, coil 11 has not yet arrived at its start position which is juxtaposed with the fused interfaces of ingot 10 and seed 13. The relay signal is normally polarized to turn motor 37 in a direction to lower work coil 11 so that it finally arrives at its start position.

Circuit 96 provides the energizing source for operating master program motor 90 which, as seen from FIG. 1, is energized at each step by a pertinent one of a plurality of switches to establish the program operation. A more detailed explanation will follow.

Circuit 97 provides the source for a melt timer 98. Timer 98 is triggered by relay signal 57 to operate during the "seed" phase of operation. The other contacts of this circuit are dummies.

Circuit 99 actuates relay 48 and involves dummies except for the second switch step, "cone" operation, whereby relay 48 is energized to maintain relay arm 47 in its right hand position. For all other phases of operation, relay arm 47 is at its left hand position and grounded through resistor 55, whereby the reference voltage fed to amplifier 41 is a constant D.C. voltage depicted as curve portion 56c in FIG. 4.

The next three circuits 100 to 102 provide electrical line power for operating program motor 65. Circuit 100 connects motor 65 to active terminals through normally closed switch 85 during the first, fifth and sixth phases of operation. In each instance, the polarity of the line is such to effect motor rotation in "reverse" direction (note FIG. 6) and corresponds to return movement of slider 63 from its upper terminal position to its lower terminal position. In circuit 100, the terminals for "cone," "middle," and "end" are dummies. Hence, this circuit is inactive during these phases of operation.

Circuits 101 and 102 energize motor 65 through the various operating combinations of switches 77 through 83. For example, during "cone" phase of operation, motor 65 may be energized for forward rotation through circuit 102. This is the only phase of operation for program motor turning in a forward direction which corresponds to driving slider 63 from its bottom terminus to its top terminus. During "end" phase of operation, motor 65 is energized through circuit 101 to turn in "reverse" direction to effect return of slider 63 from its top terminus to its bottom terminus as work coil 11 forms tapered portion 16 at the upper end of ingot 10. The circuits for motor 65 do not provide a line source during the "middle" phase of operation, at which time motor 65 remains inactive, slider 63 remains at its top terminus and the D.C. program voltage provided by potentiometer slider 63 is relatively constant and depicted as curve portion 74b in FIG. 4.

The last circuit 103 provides the signals for actuating induction furnace operator motor 58. Motor 58 operates in response to actuating signals from relay 71 during "seed" operation, in response to actuating signals from relay 57 during "cone," "middle" and "end" phases of operation and then in response to actuating signals from relay 71 during "freeze" and "return" phases of operation.

As noted hereinbefore, a variation of the molten zone thickness, for example during "cone," "middle" or "end" phases of operation will cause a corresponding change in the RF voltage across work coil 11. This is indicated by a corresponding change in meter voltage $V_{31}$. Should the indicated voltage deviate from the desired RF power pattern during melting of the ingot, the output from amplifier 41 will operate relay 57 which actuates motor 58 through circuit 103. Motor 58 will turn one way or the other in accordance with the sense of the relay signal and this will impart a temporary corrective power adjustment by resetting capacitor 27. During "cone" phase of operation, this corrective adjustment also resets slider 51. When motor 58 turns, it simultaneously moves potentiometer slider 60 to reflect the new setting for capacitor 27. This potentiometer adjustment will upset the balance sensed by differential amplifier 62. On the other hand, potentiometer slider 63 moves only by operation of program motor 65. Hence, as capacitor 27 is being adjusted through circuit 103, the balance sensed by amplifier 62 is disrupted to impart a regulating signal to relay 71 or relay 72. The actuated relay energizes motor 22 through circuit 93 whereby molten zone 12 is compressed or stretched depending upon the sense of the relay signal. The dimensional correction to the molten zone restores the size of the melted section to its programmed thickness. The work coil voltage also changes with dimensional correction to molten zone 12 to restore the setting of capacitor 27 to its programmed position with a corresponding resetting of potentiometer slider 60 and slider 51 during "cone" phase of operation. When the potentiometer signal from slider 60 returns to balance with respect to the programmed source, curve 74, operation of axial motor 22 ceases. This action assures that the desired size of the ingot 10 is maintained.

Operation is normally started with work coil 11 at the upper end of ingot specimen 10. As noted hereinbefore, prior to actual melting of specimen 10, the ingot is preheated to support large induced circulating currents. The bottom end of ingot 10 is first fused to seed 13. This entire operation is carried out by manually operating the induction furnace apparatus. Platform 35 and its mounted circuit 24 is lowered by manually operating worm drive 36, whereby work coil 11 is brought to a position 105 surrounding the confronting juxtaposed ends of ingot 10 and seed 13 as seen in FIG. 7. The RF power to coil 11 is increased, whereby these ends soften and melt. Gravity causes the molten bottom end of ingot 10 to sag in stalactite-like manner as depicted in FIG. 7a whereby it stretches downwardly to join with the molten upper end of seed 13. During this melting operation, the operator manually works worm drive 21 to raise or lower seed 13 as needed until the molten ends are satisfactorily joined. Heating chamber 34 has a suitable window to permit the operator to see what it happening inside. The foregoing action also starts the formation of ingot taper portion 14. At any convenient time after the heated ends become molten, the operator may actuate turning motor 19 for the remainder of the operation. The automatic zone refining circuit of the induction heating apparatus may be actuated after a satisfactory joint is made. However, it has been found from experience that it is preferable to defer automatic operation and first form a taper above the fused interfaces. The formed taper need only be an approximation of the programmed shape for portion 14. The taper is formed by manually working coil 11 up and down along the lower end of ingot 10 concurrently with suitable stretching or compressing of specimen 10, as such action appears to be needed. The latter is accomplished by manually operating drive means 21. Capacitor 27 may be manually adjusted to supply suitable power to work coil 11. The automatic control apparatus may be actuated after a satisfactory initial taper is formed. To initiate automatic control operation, the furnace apparatus is set for the start of "middle" operation, for example work coil 11 is raised to a height it would normally occupy at the start of "middle" phase operation. The shaft of program motor 65 is advanced to its correlated position, whereby slider 63 is at its upper terminus indicated as 20 in FIG. 1. Step switch 91 is advanced to its middle position. Tuning capacitor operator motor 58 is advanced to the position it would normally occupy at the start of "middle" phase operation, whereby sliders 51 and 60 are at their upper termini; relay switch 47 remains at left position. When automatic circuit operation is actuated, work coil 11 melts successive overlapped sections of ingot middle portion 15. As work coil 11 approaches the top end of the specimen, the control circuit enters "end" phase operation whereby tapered portion 16 is formed. "End" phase operation is followed by "freeze" and "return" operation. During the latter phase, work coil 11 returns to the lower end of the ingot specimen. For the purpose of continuity, a complete cycle of automatic operation now will be described.

The eleven circuit step switch 91 is at its return position terminal during "return" phase operation, at which time work coil 11 is traveling downwardly to its start position 105 juxtaposed with the fused interfaces of ingot 10 and seed 13. Simultaneously, program motor 65 and capacitor operator motor 58 are returning to their respective start positions. At start position, capacitor 27 is set so that generator 25 supplies a relatively low level of power to tank circuit 24 for melting a small diameter ingot core. A micro-switch 108 is in position along the path of travel of platform structure 35. Switch 108 is actuated in response to downward travel of the platform structure as work coil 11 reaches a measured distance above its start position 105. The actuated switch 108 is in circuit 96 (return position terminal) and triggers master program motor 90 to step switch 91 to "seed" phase operation, whereby the eleven sliders of each of the circuits 92 through 97 and 99 through 103 move to their seed position terminals.

Normally, program motor 65 will have completed its twenty revolutions of reverse turning and its shaft will have arrived at its start or zero degree position by the time stepper switch 91 has advanced to "seed" position. At the completion of such turning, program motor halts and its shaft remains at rest in start position. Motor 65 does not turn because circuit 100 is open. The normally closed switch contact 85 opens at completion of reverse turning and remains open until motor 65 starts forward turning.

When micro-switch 108 is actuated, coil 11 has not yet reached its start position 105. Further downward travel of its platform structure 35 is effected by slow speed motor 37. Fast speed motor circuit 94 is not active during "seed" operation, whereas motor circuit 95 responds to polarized signals from relay 57 during "seed" phase of operation. The polarity of the relay signal is normally in a direction to continue downward travel of work coil 11 as it seeks its start position 105. This polarity can be predicted because during "seed" operation, relay arm 47 is in left position whereby the reference voltage fed to amplifier 41 is a high constant value. Concurrently with downward travel of coil 11 as it seeks position 105, meter voltage $V_{31}$ is lower but is approaching balance with the reference voltage. The resistors defining the reference voltage network are selected so that a balanced status is sensed by amplifier 41 when coil 11 arrives at start position 105, at which time coil movement halts. In addition, when the balanced status is reached, the polarized relay is also adapted to trigger electric timer 98. Timer 98 is set to impart an actuating voltage to circuit 96 (seed position terminal) after a lapse of a measured time interval long enough to melt completely through the seed end of ingot 10. Upon the expiration of the measured time interval, timer 98 triggers master program motor 90 through its circuit 96. This action actuates switch 91 to advance each circuit 92–97 and 99–103 to "cone" phase operation.

It will be noted that the signals from relay 57 are employed to actuate switch circuits 95, 97 and 103 at different stages of the operation for different purposes. FIG. 8 illustrates schematically one method for effecting such operation. Essentially, relay 57 includes a pair of ganged switch arms 57a and 57b. Both switch arms 57a and 57b pivot up and down, respectively, in response to correlated polarized signals from amplifier 41, whereby arm 57a contacts the terminals 86 and 87 respectively. Terminals 86 and 87 are connected, respectively, to opposite sides of a D.C. source. Switch arm 57a is connected by a line 88 to the seed position terminal of circuit 95 and the second, third and forth position terminals of circuit 103. Switch arm 57a does not connect to any terminal for relay balanced condition, but switch arm 57b connects to an energized terminal 87a for relay balance to actuate the seed postion terminal of circuit 97 through line 89. Consequently, when coil 11 reaches start position 105, timer 98 is actuated and then circuit operation occurs in a manner hereinbefore described.

Just prior to "cone" phase operation, with program motor shaft at zero degree position, switch contacts 78, 79, 80, 81, 82 and 83nc are closed. Switch contacts 75, 77, 83no, 84 and 85 are open. Normally closed contact 77 is open because program motor shaft is at zero degree position.

The following occurs when master program motor 90 is triggered to advance to "cone" position. Motor 19 is energized and turns, whereby the lower portion of the ingot from chuck 18 up to and throughout molten zone 12 rotates around the vertical axis in respect to the portion of ingot 10 above its molten zone which latter portion is held stationary by chuck 17. Rotation of motor 19 continues during the entire melting operation and is turned off upon freezing of the uppermost molten zone of the ingot. Program motor 65 is now energized through circuit 102 for forward rotation. Relay arm 47 is switched to the right to introduce a varying D.C. reference voltage for regulating power to tank circuit 24 in accordance with the movement of slider 51. Since slider 63 at start of "cone" operation is at its lower terminus, the power fed to work coil is at a low value. Slow speed motor 37 operates continuously and independently of relay 57 during "cone" phase operation and for the next three phases of operation.

Movement of work coil 11 is synchronized with program motor 65 as follows. The operatively associated cam 76 rotates to close momentarily contact 75 once for each revolution of worm drive 36. Program motor 65 is coupled to a live line source when contact 75 is closed through contact 83nc and circuit 102 so that said program motor 65 starts rotating. Contact 75 soon opens upon initial movement of motor 65, but by this time open contact 77 returns to its normally closed status. Program motor 65 continues to rotate as a result of energization through the closed contacts 77, 81, 82, 83nc and circuit 102 even though contact 75 is then open. Program motor 65 stops turning when its shaft completes one full revolution because switch 77 opens when the program motor shaft returns to zero degree position. This halts the rotation of the program motor. The foregoing operation is repeated to turn the program motor nine additional revolutions. Each revolution is triggered by cam 76 closing switch 75 in the same manner as previously described. Hence, coil movement along ingot specimen 10 above seed 13 is synchronized with program motor operation at which time tapered portion 14 is being formed.

Switch 81 opens up and remains open in accordance with FIG. 6 at the completion of the tenth revolution of program motor 65. When program motor 65 is next energized and is in its eleventh revolution, it is energized through closed contacts 77, 78, 82, 83nc and circuit 102. However, this time program motor 65 is stopped only after it makes one-half revolution because contact 78 opens every time the motor shaft reaches its 180 degrees position. The next time cam actuated switch 75 is triggered closed, the same operation repeats except that the motor 65 then rotates from its 180 degrees position to return to its zero degree position at which time said motor stops rotating because contact 77 then opens. The foregoing half revolution steps of program motor turning continues for ten additional steps, making a total of twelve one-half revolution steps. At this point of the operation, the program motor has rotated a total of sixteen complete revolutions at which time the contact 82 opens and remains open in accordance with FIG. 6.

The completion of the stepped rotations of motor 65 is triggered as described herein, that is, by cam 76 triggering contact 75 closed for each revolution of the drive 36. The line source for motor 65 is then connected through contacts 77, 78, 79, 80 and 83nc and circuit 102. Motor operation is halted when motor shaft arrives at its 90 degrees position because switch 79 opens in accordance with FIG. 5. This is the first one-quarter revolution step for program motor 65. Motor 65 is then triggered for another one-quarter revolution step which is halted by opening of switch 78 at 180 degrees shaft position. A third one-quarter revolution step is halted by opening of switch 80 at the 270 degrees shaft position and the fourth one-quarter revolution step is halted by opening of switch 77 at zero degree shaft position. Motor 65 will undergo sixteen steps of one-quarter revolution each, which action is halted upon opening of switch 83nc at the completion of the total of twenty program motor revolutions. Consequently, 38 kicks by cam 76, or 38 corresponding thread movements of work coil 11, are synchronized to produce one complete cycle of twenty revolutions of program motor 65 in a forward direction and this is synchronized with movement of slider arm 63 from its zero terminus to its twenty revolution terminus as depicted in FIG. 2.

At the completion of the twentieth revolution of motor 85, coil 11 has arrived at the postion depicted in FIG. 4 as the end of "cone" operation and which is the start of "middle" phase operation slightly beyond the formed tapered portion 14. The coacting switch 83no closes simultaneously with opening of switch 83nc. This action triggers master program motor 90 to advance six position switch 91 to its "middle" phase of operation. At the same time, relay 48 is de-energized whereby its switch arm 47 moves to the left postion. Program motor 65 remains stationary with its shaft at zero degree position during "middle" phase operation and thus the voltage during this phase of operation is a constant value depicted by the curve portion 74b, FIG. 4.

The following occurs while program motor 65 is undergoing its measured rotations of twenty revolutions during the "cone" phase of operation. Potentiometer slider arm 63 is being driven up from its zero terminus to its twenty terminus as depicted in FIG. 1. This continuously upsets the match sensed by amplifier 62. This action operates polarized relay 71 or 72 which actuates motor 22 through circuit 93 to stretch, or if conditions so require, to compress, ingot specimen 10 in accordance with the sense of the relay signal. The actuating relay signal will be a function of the concurrent setting of slider 60. This setting may be one corresponding to a concurrent ingot thickness which is too large or too small, or an ingot thickness in agreement with the prescribed size. Whatever the situation at the particular moment, as slider arm 63 is being driven upwardly, dimensional adjustments are being imparted to molten zone 12. Such adjustments will change the RF voltage at work coil 11 to upset the match sensed by differential amplifier 41 to actuate polarized relay 57. The actuating signal from relay 57 in turn will operate motor 58 to adjust the position of slider arm 60, whereby its voltage tends to match the concurrent program voltage signal from slider 63. Capacitor 27 also is adjusted concurrently with regulation of slider arm 60 inasmuch as work coil 11 is moving upwardly to form tapered portion 14, the synchronized slider arm 63 is programmed for a gradually increasing diameter operation. Settings of capacitor 27 will in the overall follow a similar pattern and thus provide gradually increasing suitable powers for melting such increasing ingot diameters with concurrent adjustments of slider arm 51 to provide suitably adjusted reference voltages at terminal 42. The foregoing feed back operation, in particular, the interplay of resetting of capacitor 27 through relay 57 and circuit 103 in operative association with axial adjustments of the ingot molten zone through relay 71 and circuit 93, is such that the ingot geometry is automatically tapered as illustrated to form a continuous increasing diameter junction between seed 13 and ingot mid-section 15.

In analyzing the foregoing operation, it will be helpful to recall the following phenomena. As the ingot diameter is increased, the equivalent inductance of the work tank circuit decreases. This shifts its frequency characteristic curve 32 to the right to increase the separation of the resonant frequency of work tank circuit 24 from oscillator frequency. The increasing ingot diameter requires more power for melting same. Consequently, the oscillator frequency also should be shifted to the right to decrease the separation. This is brought about by tuning capacitor 27 to decrease its capacitance, and it is accomplished by suitable automatic regulation of operator motor 58. Such action translates as upward travel of slider arm 60, which in turn is in agreement with the fact that slider arm 63 is being driven upwardly by program motor 65. The foregoing feedback regulation will result in an actuating signal from relay 71 which may call for a compression or a stretching signal depending upon the momentary size of ingot 10 and the then voltage relationship of the slider arms 60 and 63. Generally, when slider arm 63 is above slider arm 60, the generated signal is a compression; whereas, when slider arm 60 is above slider arm 63, the generated signal is a stretch. Conversely, when slider arm 63 is being lowered and slider arm 60 follows a stretching signal is generated. This type of signal will be observed during formation of the diminishing tapered section 16 during "end" phase operation, to be described hereinafter.

The reference voltage selected atnd supplied to amplifier 41 during "middle" phase operation is constant and suitable for uniform large diameter melting as motor 37 continues to advance work coil 11 upward along specimen 10. During melting of section 15, if there is any change in the thickness of the floating molten zone, this will cause the voltage of work coil 11 to change. This is detected immediately by differential amplifier 41 against the constant reference voltage. The unbalance is amplified to operate polarized relay 57 which in turn actuates operator motor 58 to reset capacitor 27 to change temporarily the power level supplied to work coil 11 to a corrective value. The setting of potentiometer arm 60 is simultaneously adjusted when capacitor 27 is changed. The resetting of slider 60 is detected and compared with the fixed program reference provided by slider 63. The unbalance is detected by amplifier 62 and actuates polarized relay 71 or 72, whereby the relay signal will operate motor 22 through circuit 93 either to push or pull ingot specimen 10 to correct for the variation initially detected in the size of zone 12. This geometrical adjustment in turn is sensed and changes voltage across coil 11 ultimately to return capacitor 27 to its desired setting.

The illustrated feedback circuit is actuated to convert from "middle" operation to "end" operation when work coil 11 reaches the upper usable end of specimen 10. It has been found that upon freezing out the melt operation, radially projecting enlargements often grow out of the ingot at the region of its uppermost melt zone. These enlargements involve accumulations of impurities. A taper is formed at portion 16 to provide a clearance for the coil structure to avoid having the enlargements strike the coil during its return travel to the lower end of ingot 10 after freeze out. In view of its purpose, the axial length of taper portion 16 may be relatively shorter than cone section 14 and its narrowest diameter slightly less than the diameter of middle portion 15. The clearance taper 16 is formed during "end" operation, which operation is actuated by a micro-switch 106 suitably located in chamber 34 along the path of travel of platform structure 35. Micro-switch contact 106 closes when it is actuated by the upwardly passing platform structure 35. This in turn energizes master program motor 90 to advance six-position switch 91 to step into "end" phase operation.

Contacts 77, 81, 82, 83nc and 84 are open prior to turning of program motor 65 at the start of "end" phase of operation. Contact 77 is open because program motor shaft has been halted at zero degree position and has remained stationary during "middle" phase operation. The following contacts are closed prior to turning of motor 65 at the start of "end" phase operation: 78, 79, 80, 83no and 85. Contact 83no will open when its corresponding contact 83nc closes upon turning of motor 65. With switch 91 in "end" phase operation, the slider 101a of circuit 101 is coupled to a live line to prepare program motor shaft to turn in "reverse" direction. As coil 11 advances with turning of worm drive 36, switch 75 is triggered by cam 76 to close momentarily. This starts the rotation of the motor 65 through circuit 101. Switch 75 opens with the commencement of rotation of motor shaft. However, switch 77 then closes, hence motor 65 operates due to energization through switches 77, 78, 79 and 80. The program motor shaft will turn in "reverse" direction only for one-quarter revolution because when the shaft reaches 270 degrees position, switch 80 opens. On the next revolution of worm drive 36, cam 76 triggers switch 75 closed, thereby to start program motor 65 turning again, and its shaft then moves from its 270 degrees position to halt when its shaft reaches its 180 degrees position because switch 78 then opens. The next one-quarter revolution of turning is halted by opening of switch 79, and the follow-one-quarter revolution of turning is halted by opening of switch 77. Consequently, program motor 65 then rotates in reverse in steps of one-quarter revolution at a time.

A micro-switch 107 is positioned in chamber 34 along the path of travel of platform structure 35 to convert "end" operation to "freeze" operation. Switch 107 is located for actuation by the upwardly passing structure 35 to effect the aforesaid conversion just about the time program motor 65 completes its sixteenth one-quarter step of reverse turning. Master program motor 90 is energized by the closing of switch 107 to advance switch 91 to step into "freeze" phase operation.

Relay 48 is not actuated during "end" phase operation for two reasons. The narrowest diameter of the constriction at the upper end of ingot 10 is almost the same as the size of the middle portion 15. The axial length of portion 16 is shorter than the length of cone portion 14. In actual practice, it has been found that the variable reference voltage which would be required for "end" phase operation is essentially equal to the constant voltage utilized during "middle" phase operation which justifies holding relay arm 47 in left position. Accordingly, a constant reference voltage, curve portion 56c, is fed to amplifier 41 during this phase of operation. Turning of program motor during "end" operation returns slider 63 to its lower terminus. This action translates as an axial regulating signal to circuit 93 to form the diminishing diameter tapered portion 16. As a consequence, meter 31 detects an unbalance which imparts a suitable signal to circuit 103 to cause motor 58 to reset capacitor 27 and lower slider 60 accordingly. Simultaneously, slider 51 is returned to its zero terminus. The foregoing resetting of capacitor 27 means gradual decreasing values of RF generator power are fed to the work tank circuit 24.

Regulation of capacitor 27 during "freeze" operation continues the decrease of generator power. As the generator power drops, the upper end of the ingot specimen freezes out and cures in the shape of the constricted configuration substantially as shown in FIG. 4; the radial enlargements that might occur in the constriction are not shown in FIG. 4.

"Freeze" operation serves the following purposes. It marks the end of the melting operation and provides a convenient transition to "return" phase operation. "Freeze" operation deactivates rotation motor 19, axial motor 22 and it also shifts program motor 65 to energizing circuit 100 through switch contact 85, which switch is normally closed in accordance with FIG. 6. Circuit 100 allows program motor 65 to rotate continuously in reverse direction during "freeze" and "return" phases of operation to complete its twenty revolutions. The foregoing action discontinues program motor rotation by steps. Program motor 65 will stop upon the completion of its cycle of reverse rotation when its shaft arrives at zero degree or start position, at which time the cam actuated switch contact 85 opens to break circuit 100. During the aforesaid reverse rotation of motor 65, slider 63 is driven continuously to its start terminus.

The cam operator for the normally open switch 84 activated by program motor 65 is designed to close this switch (see FIG. 6) a measured time interval after the RF power to work coil 11 has dropped to a level where ingot melting has ceased. The closed contact 84 energizes program motor 90 to step switch 91 into "return" phase operation. Switch 84 may be designed to open at any convenient time after it triggers master program motor 90. During "freeze" operation, coil 11 continues its upward movement. However, "return" phase operation deactivates motor 37 and now introduces fast coil motor 38 to return work coil 11 to its bottom position 105 at a relatively fast rate. At the start of "freeze" operation and continuing through "return" operation, circuit 103 is actuated by polarized signals from relay 71, whereby sliders 51 and 60 are driven by motor 58 toward their respective zero or start termini. Corresponding adjustments to capacitor 27 reset said capacitor to its low power start position. As noted hereinbefore, "return" operation converts to "seed" phase operation when platform structure 35 actuates micro-switch 108 at which time master program motor 90 is energized to advance switch 91 to its "seed" posititon terminal.

In actual practice, program motor 65 will have completed its twentieth revolution of reverse rotation to halt with its shaft at zero degree position by the time the auomatic control circuit has been advanced to "seed" phase operation. However, should program motor 65 require just a few degrees of additional rotation to bring its shaft to zero degree position after switch 108 is actuated, circuit 100 is designed to effect such motor rotation by energizing program motor 65 when the master program switch 91 is in seed position. For the same reason, the seed position terminal for circuit 103 also permits operator motor 58 to complete return of sliders 51, and 60 and capacitor 27 to their respective zero positions, too.

In addition, during "freeze" and "return" phase of operation, amplifier 41 detects unbalance between the voltages supplied thereto. However, the output of relay 57 is not used for these two phases of operation.

When master program switch 91 is advanced to "seed" operation, the foregoing described operation is repeated, and will be permitted to repeat as many times thought necessary for purifying the ingot. The control circuit also includes an additional pair of micro-switches 109 and 110 which are suitably positioned along the path of travel of platform structure 35. These switches serve merely as mechanical safeties to prevent overrun of the movable work tank structure in the case of malfunction.

The foregoing automatic induction furnace zone refiner is illustrated as treating silicon. It will be understood that the apparatus and methods shown herein may be applied to refine other materials, metals or semi-conductors. In addition, the apparatus is adaptable for semi-automatic operation. During semi-automatic operation, the program motor 65 feedback loop is not used whereas the regulating signal from relay 57 is used to actuate axial motor 22 during melt operation. For example, semi-automatic operation may be employed for treating a uniform diameter metal rod. As the size of the work piece changes from a prescribed diameter during melt operations, unbalanced regulating signals from relay 57 energizes motor 22 to push or pull the work piece to return its size to proper diameter. The reference voltage fed to amplifier 41 during semi-automatic operation, may be a fixed value corresponding to the power required for the prescribed size for the work piece as tuning capacitor 27 remains fixed during the melt operation.

What is claimed is:

1. Apparatus for refining a rod-like specimen of conductive material, comprising
    an RF parallel resonant work tank circuit having an inductance work coil movable along said specimen for heating successive sections of said specimen by induction to a molten state,
        with the resonant elements of said tank circuit of substantially constant value during the operation of the apparatus except insofar as variations in the specimen may cause variations in the inductance of the work tank circuit and thus of the resonant frequency of work tank circuit;
    an RF generator having a parallel resonating oscillator tank circuit with a variable tuning element for varying the frequency of the output of the RF generator,
        the frequency of the output of said RF generator being at all times during the refining operation less than the resonant frequency of the work tank circuit;
    a relatively loose coupling between the work tank circuit and the oscillator tank circuit effective to transmit RF power to the work tank circuit without causing any change in the resonant frequency of the work tank circuit, resulting from variations in the diameter of the specimen, to appreciably affect the frequency of the output of the RF generator;
    operator means for regulating the setting of the variable tuning element of the oscillator tank circuit;
    measuring means providing a voltage signal proportional to the RF voltage across said work tank circuit;
    means providing a reference voltage operatively related to the RF voltage required for melting successive sections of said specimen;
    means comparing the voltage derived from said measuring means and reference voltage means and providing a regulating signal in response to the unbalance between said voltages; and
    switch means responsive to said regulating signal of said measuring means for selectively actuating said operator means to increase the frequency of the output of the RF generator when the change in the diameter of the specimen causes the resonant frequency of the work tank circuit to increase, and to decrease the frequency of the output of the RF generator when a change in the diameter of the specimen causes the resonant frequency of the work tank circuit to decrease.

2. Apparatus as set forth in claim 1, further comprising
    a first circuit providing a voltage directly corresponding to the setting of the variable tuning element of the oscillator tank circuit and independent of the load upon the RF generator;
    a second circuit providing a second reference voltage;
    means for matching the voltage derived from said first circuit with said second reference voltage and providing a second regulating signal in response to the unbalance between said voltages; and
    means responsive to said second regulating signal for selectively compressing or stretching said specimen in an axial direction.

3. Induction heating apparatus for treating a rod-like specimen of conducting material, wherein energy is furnished by an RF generator to an induction heating work tank circuit including a capacitor in parallel with an inductance coiled about said specimen, wherein the inductance coil is moved axially along said specimen to induce current flow in said specimen for heating same, whereby sections of said specimen successively overlapped by said coil convert to a molten state, and wherein the RF generator includes a resonant tank circuit defined by a capacitor element and an inductance element connected in parallel with one of said elements being variable,
    the output frequency of said RF generator, determined by the resonant frequency of said RF generator resonant tank circuit, being at all times during the treatment of the specimen less than the resonant frequency of the work tank circuit, and
    said apparatus including
        a first circuit providing a voltage directly corresponding to the setting of the variable one of said RF generator resonant tank circuit elements and independent of the load upon the RF generator;
        a second circuit providing a reference voltage;
        means for matching said voltages and providing a regulating signal in response to the unbalance between said voltages; and
        means selectively compressing or stretching said specimen in an axial direction in response to said regulating signal.

4. In induction heating apparatus for treating a rod-like specimen of conducting material, wherein energy is furnished by an RF generator to an induction heating work tank circuit including a capacitance in parallel resonance with an inductance coiled about said specimen, the combination comprising,
    means for moving said inductance coil along said specimen for inducing current flow in said specimen for heating said specimen whereby sections of said specimen successively overlapped by said coil convert to a molten state,
    said RF generator having a resonant tank circuit defined by parallel connected capacitor and coil inductance elements oscillating at a frequency different from the frequency of the work tank circuit, one of said elements being adjustably variable,
    operator means for regulating the variable one of said oscillator elements,
    a first circuit providing a voltage corresponding to the setting of the variable one of said oscillator elements, while the inductance coil, in moving along said specimen, converts successive sections thereof to the molten state,
    a second circuit providing a reference voltage,
    means for matching said voltages and providing a regulating signal in response to the unbalance of said voltages,
    means for controlling the geometry of said specimen in response to said regulating signal, and
    means effective while the inductance coil, in moving along said specimen, converts successive sections thereof to the molten state, for sensing the RF voltage across said work tank circuit and for regulating said operator means as a function of the gauged RF voltage, whereby said variable oscillator elment setting is adjusted while the inductance coil, in moving along said specimen, converts successive sections thereof to the molten state.

5. In induction heating apparatus for treating a rod-like specimen of conducting material, wherein energy is furnished by an RF generator to an induction heating work tank circuit including a capacitance in parallel resonance with an inductance coiled about said specimen, the combination comprising,
 means for moving said inductance coil along said specimen for inducing current flow in said specimen for heating said specimen whereby sections of said specimen successively overlapped by said coil convert to a molten state,
 said RF generator comprising a resonant tank circuit defined by parallel connected capacitor and coil inductance elements oscillating at a frequency different from the resonant frequency of said work tank circuit, one of said elements being adjustably variable,
 a first circuit providing a voltage directly corresponding to the setting of the variable one of said oscillator elements, and independent of the load upon the RF generator,
 a second circuit providing a reference voltage,
 means for matching said voltages and providing a regulating signal in response to the unbalance between said voltages, and
 means selectively compressing or stretching said specimen in an axial direction in response to said regulating signal.

6. In induction heating apparatus for treating a rod-like specimen of conducting material, wherein energy is furnished by an RF generator to an induction heating work tank circuit including a capacitance in parallel resonance with an inductance coiled about said specimen, the combination comprising,
 means for moving said inductance coil along said specimen for inducing current flow in said specimen for heating said specimen whereby sections of said specimen successively overlapped by said coil convert to a molten state,
 said RF generator having a resonant tank circuit defined by parallel arranged capacitor and coil inductance elements oscillating at a frequency differerent from the resonant frequency of said work tank circuit,
 means for sensing the RF voltage at said work tank circuit independently of the current in the plate circuit of the RF generator, and providing a D.C. voltage proportional to said RF voltage,
 a source of predetermined D.C. reference voltage,
 means for comparing said D.C. voltages for providing an actuating signal in response to the unbalance between said voltages, and
 operator means for stretching and compressing said specimen in response to said actuating signal for regulating automatically the diametrical size of said specimen.

7. Apparatus as set forth in claim 1, further comprising means ultimately dependent upon the position of the work coil along the axis of the rod at one end of the specimen for regulating said reference voltage to provide a voltage pattern that tends to produce a conical shape to the specimen at said one end thereof, wherein there is fused to the specimen a seed crystal having a diameter smaller than that of the specimen.

8. Apparatus as set forth in claim 7, wherein the reference voltage regulating means provides a reference voltage that gradually decreases to a minimum value and then gradually increases to approximately its initial value as the work coil moves from the smallest diameter end to the largest diameter portion of the cone portion of the specimen.

9. Apparatus as set forth in claim 7, further comprising
 a source of fixed voltage, and
 a voltage dividing resistance connected across the source of fixed voltage, said voltage dividing resistance including
  in series two fixed resistances and
  a potentiometer having a slider movable between its terminal ends,
  with the fixed connection to the resistance element of the potentiometer connected to a point intermediate the terminal ends of the potentiometer,
  the slider of the potentiometer being moved from one terminal position to the other terminal position as the work coil moves from the beginning to the end of the conically shaped portion of the specimen, and
  with the voltage across the potentiometer and one of the fixed resistances being the reference voltage introduced to said voltage comparing means while the conically shaped portion of the specimen is refined.

10. Apparatus as set forth in claim 2, further comprising
 means directly responsible to the position of said operator means for varying the first reference voltage while refining one end of the specimen to provide a conical shape at that end where there is fused to the specimen a seed crystal having a diameter smaller than that of the specimen.

11. Apparatus as set forth in claim 10, further comprising
 means dependent upon the position of the work coil, as it moves from the smallest diameter end of the cone portion of the specimen to the largest diameter portion of such cone portion, for varying the second reference voltage.

12. Apparatus as set forth in claim 11, wherein
 the means directly responsive to the position of the operator means provides a first reference voltage that gradually decreases to a minimum value and then gradually increases to approximately its initial value as the position of the operator means moves from a position corresponding to the smallest diameter end of the cone portion of the specimen to the largest diameter portion of such cone portion, and in which
 the means for varying the second reference voltage provides a second reference voltage that gradually increases from minimum to maximum value as the work coil moves from the smallest diameter end of the cone portion of the specimen to the largest diameter portion of such cone portion.

13. Apparatus as defined in claim 5, further including means for varying said reference voltage to follow a prescribed voltage pattern synchronized with work coil movement along said ingot specimen.

14. Apparatus as defined in claim 5, wherein
 said first and second circuits include
  individual potentiometers having respective sliders,
  means for providing a D.C. voltage drop across said potentiometers, and
  means for varying the potentiometer slider of the second circuit to provide a reference voltage in accordance with a voltage pattern synchronized with work coil movement along said ingot specimen, and wherein
 said matching means includes
  a differential amplifier for receiving and matching the D.C. voltages at the respective potentiometer sliders, and
  polarized relay means for responding to the output signal from said amplifier.

15. In an induction heating apparatus for treating a rod-like specimen of conducting material, wherein energy is furnished by an RF generator to an induction heating work tank circuit including a capacitance in parallel resonance with an inductance coiled about said specimen, and including means for moving said inductance coil along said specimen for inducing current flow in said specimen for heating said specimen whereby sections of said specimen successively overlapped by said coil convert to a molten state, said RF generator having a resonant tank circuit defined by parallel arranged capacitor and coil inductance elements, the capacitor element being adjustably variable, said apparatus also including operator means for regulating the variable one of said oscillator tank circuit elements, means for sensing the RF voltage at said work tank circuit and providing a voltage proportional to said voltage, a source of predetermined reference voltage, and means for comparing said voltages and providing an actuating signal in response to the unbalance between said operator means having means responsive to said actuating signal for adjusting the variable one of said tank elements for regulating the RF voltage at said work tank circuit, the improvement which comprises having the frequency of the output of said RF generator at all times while said inductance coil moves along said specimen and induces current flow therein for treating the same, at a frequency less than the resonant frequency of said work tank circuit, with said comparing means including a differential amplifier and polarized relay means responsive to the output signal from said amplifier, said sensing means including rectifier means for providing an input D.C. voltage to said amplifier proportional to the sensed RF voltage, the reference voltage being a D.C. voltage fed to said amplifier, said improvement also comprising means responsive to the position of the work coil along the axis of the rod for regulating said reference voltage to provide a voltage pattern for proper refining of said ingot specimen as said work coil moves along the axis of said rod, said relay means furnishing said actuating signal to said operator means in response to the unbalance and direction of unbalance between said D.C. voltage inputs to said amplifier, said operator means including a reversible motor adaptable for rotation in selective directions and being actuated in response to the relay actuating signal for adjusting the setting of said variable capacitor.

16. Apparatus as defined in claim 15, wherein said reference source comprises a voltage divider loop including a potentiometer having a slider, means selectively conductively connecting said slider to said comparing means for furnishing a variable input voltage thereto, a D.C. source having one side tapped to an intermediate portion of the resistance element of said potentiometer, the other side of said D.C. source being conductively connected to said comparing means through a resistance for completing the aforesaid divider loop, movement of said potentiometer slider between its terminal ends on opposite sides of said potentiometer tap thereby providing a V-shaped D.C. voltage to said comparing means.

17. In an apparatus for refining a rod-like specimen of conductive material, said apparatus including an RF parallel resonant tank circuit defining induction heating means including an inductance work coil movable along said specimen, an RF generator for supplying power to said work tank circuit for inducing current flow in said specimen to heat said specimen whereby the sections thereof successively overlapped by the moving work coil are reduced to a molten state, said generator including a parallel resonating tank circuit having an adjustably variable capacitor, said generator oscillating at a frequency different from the frequency of said work tank circuit, measuring means providing a voltage signal proportional to the RF voltage across said work tank circuit, means providing a regulated reference voltage operatively related to the voltage required for melting successive sections of said specimen, means comparing said voltages and providing a regulating signal in response to the unbalance between said voltages, operator means for regulating the setting of said variable capacitor, and switch means for selectively actuating said operator means in response to said regulating signal to provide a correlated adjustment to said variable capacitor setting, the improvement which comprises circuit means for providing a voltage directly corresponding to the variable capacitor setting, means providing a regulated reference voltage in accordance with a prescribed and programmed pattern synchronized with work coil movement along said specimen, means for matching the last-mentioned voltages and providing an actuating signal in response to the unbalance between said voltages, axial operator means for selectively stretching and compressing said specimen in an axial direction to vary the geometry of its molten section, and means responsive to the last-mentioned voltage matching means to actuate said axial operator means for regulating the geometry of the molten section in response to an actuating signal from said matching means, said second regulated reference voltage means including means for synchronizing the reference voltage of said second reference means with the position of said work coil along said specimen.

18. Apparatus as defined in claim 17, wherein said synchronizing means comprises a reversibly rotatable program motor and switch motor means operatively responsive to turning of said program motor, said switch motor means controlling said program motor operation for turning through measured quantities of rotation in selective directions in synchronism with movement of said work coil along said specimen.

19. Apparatus as defined in claim 18, wherein said switch motor means comprising a plurality of four series connected and normally closed switches, the first, second, third and fourth of said switches open when the program motor shaft is at zero degree, 180 degrees, 90 degrees, 270 degrees position respectively, said switch motor means also including a pair of series connected and normally closed switches, the first of said pair of switches being in shunt across the second switch of the four and adapted to open after a measured number of program motor revolutions, the second switch of said pair being shunted across the third and fourth switches of the four and being adapted to open after a measured number of program motor revolutions after opening of the first switch of the pair, a source for energizing said program motor, an additional switch conductively connecting said source and the common terminal of said fourth switch and the second switch of said pair, said additional switch being normally closed and adapted to open in response to program motor turning through a measured number of revolutions after opening of the second switch of said pair, whereby said program motor is energized for selective rotation in steps of one revolution, one-half revolution and one-quarter revolution depending upon its direction of rotation, a normally open triggering switch shunted across said four switches for starting motor rotation, and means for closing said triggering switch in synchronism with work coil movement.

20. Apparatus as defined in claim 17, further including means for moving said work coil in selective directions along said specimen, and selective switch means to control the operation of said work coil moving means in accordance with a plurality of phases of refining operation depending upon the position of said work coil with respect to said specimen, a monocrystal seed fused to one end of said specimen, said seed being diametrically much smaller than the diameter of said specimen, and the aforesaid refining phases of operation comprising, a first phase correlated to said work coil being at the seed end of said specimen for melting through same, a second phase of operation correlated with melting of said specimen a measured distance from its seed end towards its other end, said second phase also being accompanied by actuating signals from said matching means for forming an increasing diameter taper along the measured distance of said specimen to define a uniform joint with said seed, the third phase, corresponding to melting of said specimen along its uniform diameter portion, the fourth phase of operation corresponding to melting said specimen concurrently with actuating signals from said matching means for forming a diminishing diameter taper for a measured distance past said uniform diameter portion of said specimen, the fifth phase of operation discontinuing specimen melting and providing a transition from the aforesaid fourth phase to a sixth phase of operation, and the sixth phase of operation corresponding to returning said work coil to its seed end position, and means for stepping said selective switch from one phase of operation to the next in synchronism with work coil movement.

21. Apparatus as defined in claim 20, wherein said work coil moving means comprises first means for moving said work coil at a relatively slow rate from its seed end to its fifth phase phase position inclusive, and second means for returning said work coil towards its seed end at a relatively faster rate.

22. Apparatus as defined in claim 20, wherein said selective switch is adapted to couple said comparing means and said matching means alternately to said capacitor operator means for actuating said capacitor operator means in response to a regulating and actuating signal, respectively.

23. Apparatus as defined in claim 22, wherein said selective switch couples said matching means to said capacitor operator means for the first, fifth, and sixth phases of operation.

24. Apparatus as defined in claim 22, wherein said selective switch couples said comparing means to said capacitor operator means during the second, third and fourth phases of operation.

25. Apparatus as defined in claim 20, wherein said selective switch is adapted to couple said comparing means to said coil moving means for actuating same in response to a regulating signal from said comparing means.

26. Apparatus as defined in claim 20, further including means for rotating said specimen about its longitudinal axis during the second, third and fourth phases of operation, said selective switch also being adapted to actuate said axial operator means in response to actuating signals from said matching means during like phases of operation.

References Cited by the Examiner

UNITED STATES PATENTS

| 2,691,732 | 10/1954 | Boyd et al. | 219—10.77 |
| 2,897,329 | 7/1959 | Matare | 219—10.73 |
| 2,902,350 | 9/1959 | Jenny et al. | 23—301 |
| 2,905,798 | 9/1959 | Freutel | 219—10.73 |
| 2,913,561 | 11/1959 | Rummel et al. | 219—10.43 |
| 2,926,075 | 2/1960 | Pfann | 23—301 |
| 2,992,311 | 7/1961 | Keller | 219—10.77 |
| 3,046,379 | 7/1962 | Keller et al. | 219—10.77 |

FOREIGN PATENTS

| 962,006 | 4/1957 | Germany. |
| 1,022,698 | 1/1958 | Germany. |

ANTHONY BARTIS, *Acting Primary Examiner.*

RICHARD M. WOOD, *Examiner.*

L. H. BENDER, *Assistant Examiner.*